United States Patent [19]

Yamaguro et al.

[11] Patent Number: 5,441,401
[45] Date of Patent: Aug. 15, 1995

[54] METHOD OF DECREASING NITROGEN OXIDES IN COMBUSTION DEVICE WHICH PERFORMS CONTINUOUS COMBUSTION, AND APPARATUS THEREFOR

[75] Inventors: Akira Yamaguro, Chiryu, Japan; Shigenori Haramura, East Sussex, United Kingdom; Naoki Minamoto, Toyota, Japan; Yujiro Oshima, Nagoya, Japan; Hideaki Muraki, both of Nagoya, Japan; Katsushi Abe, Aichi, Japan; Koji Yokota; Kazuo Kawahara, both of Nagoya, Japan

[73] Assignee: Aisin Seiki Kabushiki Kaisha, Kariya, Japan

[21] Appl. No.: 943,015

[22] Filed: Sep. 10, 1992

[30] Foreign Application Priority Data

Sep. 13, 1991 [JP] Japan .................. 3-235036

[51] Int. Cl.$^6$ ................................ F23J 7/00
[52] U.S. Cl. .......................... 431/4; 431/2; 431/7; 60/517
[58] Field of Search ............ 431/2, 4, 7; 60/301, 60/303, 286, 517; 123/3

[56] References Cited

U.S. PATENT DOCUMENTS

| | | | |
|---|---|---|---|
| 3,699,218 | 10/1972 | Smith et al. | 423/648 |
| 3,719,749 | 3/1973 | Smith et al. | 423/650 |
| 3,826,810 | 7/1974 | Lawson | 60/301 X |
| 3,986,350 | 10/1976 | Schmidt | 60/301 X |

FOREIGN PATENT DOCUMENTS

| | | |
|---|---|---|
| 63-68714 | 3/1988 | Japan . |
| 64-39459 | 3/1989 | Japan . |
| 1-138352 | 5/1989 | Japan . |
| 1578149 | 1/1977 | United Kingdom . |

OTHER PUBLICATIONS

"Characteristics and Applications of Solid Polymer Electrolyte Technology", Hiroyasu Takenaka, GS news 46 (1) (1987).
Japanese Text, pp. 56-65[1].

Primary Examiner—Carl D. Price
Attorney, Agent, or Firm—Burns, Doane, Swecker & Mathis

[57] ABSTRACT

An apparatus for decreasing nitrogen oxides in a combustion device of Stirling engine which performs continuous combustion includes a combustion chamber, means for supplying the combustion chamber with fuel and air, an exhaust passageway for discharging exhaust gas produced by combustion in the combustion chamber, a catalytic unit arranged in the exhaust passageway for purging toxic components contained in the exhaust gas discharged, and hydrogen supply means for supplying hydrogen gas to the exhaust gas which enters the catalytic unit. The hydrogen gas is supplied to the combustion exhaust gas which has entered the catalytic unit, and the combustion exhaust gas is then catalytically reduced in an environment of a comparatively low temperatures of less than 250° C., whereby the nitrogen oxides in the exhaust gas are decreased.

1 Claim, 7 Drawing Sheets

METHOD OF DECREASING NITROGEN OXIDES IN COMBUSTION DEVICE WHICH PERFORMS CONTINUOUS COMBUSTION, AND APPARATUS THEREFOR

BACKGROUND OF THE INVENTION

1. Field of the Invention

This invention relates to a method and apparatus for decreasing nitrogen oxides discharged from a continuous combustion device of an external combustion engine, a boiler, etc. More particularly, the invention relates to a purification system for effectively purging nitrogen oxides by reduction without detracting from the excellent fuel-consumption characteristic of an engine such as a Stirling engine and without being influenced by the concentration of oxygen gas which coexists in the exhaust gas.

2. Description of the Prior Art

In the operation of a Stirling engine, which is one type of external combustion engine, there is a process in which a working gas is heated and caused to expand by burning a fuel using a burner disposed in a combustion chamber. The heating of the working gas by combustion using a burner ordinarily utilizes the heat of combustion produced by supplying the interior of a combustion chamber with fuel and air for combustion and burning the fuel at high temperature. The exhaust gas resulting from combustion is discharged into the atmosphere through an exhaust passageway. In this case the fuel is completely combusted along with the combustion air at high temperature so that the exhaust gas will not contain any toxic components. However, even if combustion is performed under conditions in which the concentration of air is low (i.e., in which there is a low excess coefficient), the fact that exhaust gas resulting from continuous combustion will contain nitrogen oxides (NOx) cannot be avoided, even though the amount of uncombusted components HC and CO in the exhaust gas is low.

Methods of decreasing nitrogen oxides in exhaust gas produced by a continuous combustion device include a rarefied combustion method, a method which uses a ternary catalytic converter, etc. However, when a continuous combustion device of a Stirling engine or the like is considered, the air supplied in the rarefied combustion method is large in quantity and, hence, there is a decline in the combustion flame temperature. In addition, in order to increase the quantity of air supplied, there is an increase in the power consumed by an air-supply blower, thereby inviting a decline in engine efficiency. Accordingly, combustion usually is carried out at a low excess coefficient, namely an excess coefficient ranging from 1.1 to 1.3. As a consequence, this combustion method does not result in rarefied combustion and does not meet the conditions for decreasing nitrogen oxides.

For these reasons use of a ternary catalytic converter has been considered to be effective. In accordance with a method using a ternary catalytic converter, NOx, CO and HC present in exhaust gas are chemically converted into non-toxic components such as $N_2$, $CO_2$ and $H_2O$ by a purifying catalyst. Since the chemical conversion proceeds at the same time as oxidation and reduction, it is required that the exhaust gas be maintained at a low oxygen concentration in order to raise the efficiency of reduction. In addition, the amount of change allowed in the oxygen concentration is very small. In order to employ this method, therefore, it is required that the amount of fuel and combustion air supplied be controlled with great accuracy. Properly speaking, the HC, and CO components in continuous combustion are low, even in case of a low excess coefficient, and therefore use of a ternary catalytic converter is not especially required. If a ternary catalytic converter is employed, it is necessary that the temperature of the exhaust gas be raised to 400~450° C. or higher. When exhaust gas is elevated to a high temperature, preheating of the air by the exhaust gas cannot be carried out sufficiently and the temperature of the air supplied to the combustion section falls. This causes a decline in engine efficiency and is undesirable. Furthermore, since the exhaust gas exhibits a high temperature, there is a decline in the durability of the catalyst and an increase in cost since expensive precious metals must be used for the catalyst.

SUMMARY OF THE INVENTION

Accordingly, an object of the present invention is to provide a method and apparatus for decreasing nitrogen oxides discharged from a continuous combustion device in which the aforementioned problems encountered in the prior art are solved.

Another object of the present invention is to provide a method and apparatus through which the nitrogen oxides in exhaust gas discharged from the continuous combustion device of an external engine, a boiler or the like are decreased by purification, without diminishing the efficiency of the combustion device, irrespective of the concentration of oxygen contained in the exhaust gas.

According to the present invention, the foregoing objects are attained by providing a method of decreasing nitrogen oxides in a combustion device which performs continuous combustion, wherein nitrogen oxides in combustion exhaust gas, which contains oxygen gas, produced by combustion of a supplied fuel in the combustion device are decreased by being passed through a catalytic unit, comprising the steps of supplying hydrogen gas to the combustion exhaust gas which enters the catalytic unit, and catalytically reducing the combustion exhaust gas, which has been supplied with the hydrogen gas, in an environment of a comparatively low temperature of less than 250° C., thereby decreasing the nitrogen oxides.

Further, according to the present invention, the foregoing objects are attained by providing an apparatus for decreasing nitrogen oxides in a combustion device which performs continuous combustion, comprising a combustion chamber, first supply means for supplying the combustion chamber with fuel and air, an exhaust passageway for discharging exhaust gas produced by combustion in the combustion chamber, catalytic means arranged in the exhaust passageway for purging toxic components contained in the exhaust gas discharged, and second supply means for supplying hydrogen gas to the exhaust gas which enters the catalytic means.

Examples of devices which can be utilized as the second means for supplying hydrogen include a reformer for modifying the water vapor in the fuel, a device for partially oxidizing the fuel, and an electrolytic device utilizing a proton-conductive membrane.

In the method of decreasing nitrogen oxides in a combustion device according to the present invention, the reducing hydrogen gas mixes with the exhaust gas introduced to the catalytic device. Owing to contact with the purifying catalytic converter in the catalytic device, the nitrogen oxides are purged by catalytic reduction under conditions of low temperature, i.e., at temperatures less than 250° C.

If hydrogen gas is supplied in an amount sufficient to reduce the nitrogen oxides contained in the exhaust gas, the nitrogen oxides can be purged effectively irrespective of the concentration of oxygen present in the exhaust gas. Furthermore, owing to the inclusion of the hydrogen gas, purification of the exhaust gas can be performed at a lower temperature in comparison with a case in which there is no hydrogen-gas content. As a consequence, the durability of the catalyst is enhanced. In addition, the catalyst itself can be one which possesses a catalytic reducing function, and cost is lowered as a result. Moreover, since the temperature of the exhaust gas is lowered, the heat can be used to preheat the combustion air correspondingly, thereby raising preheating efficiency.

In the apparatus for decreasing nitrogen oxides in a combustion device according to the present invention, the exhaust gas discharged as a result of continuous combustion is supplied with hydrogen gas so that the nitrogen oxides can be removed by a catalytic reduction reaction with the purifying catalyst. Since the catalytic reduction reaction proceeds at a low temperature of less than 250° C., there is no decline in the efficiency of the combustion device. In addition, the amount of hydrogen gas supplied need only be enough to reduce the nitrogen-oxide content, and the gas may coexist with an oxidizing gas such as oxygen. This means that absolutely pure hydrogen gas need not be used. In other words, use can be made of inexpensive hydrogen gas inclusive of other gases as well, examples being electrolyzed gas obtained by using a proton-conductive membrane, hydrogen gas obtained by modification of fuel water vapor, and hydrogen gas obtained by partial combustion process. Moreover, since purification is performed at a low temperature of less than 250° C., the catalyst can be placed in the exhaust passageway. In addition, temperature regulation is not especially required for purification of the exhaust gas.

In accordance with the present invention, nitrogen oxides contained in exhaust gas discharged owing to combustion in a continuous combustion device of an external combustion engine, boiler or the like can be readily decreased or eliminated at low temperatures of less than 250° C., without any influence from the concentration of oxygen in the exhaust gas, by supplying hydrogen gas in an amount commensurate with the amount of nitrogen oxides. This makes it possible to improve the efficiency of the system by elevating the combustion temperature, which could not be done in the conventional apparatus because of an increase in the nitrogen oxides that would result. Moreover, owing to running of the apparatus at a low excess coefficient, only a small amount of air need be supplied. This makes it possible to reduce blower power and noise. Furthermore, since a comparatively inexpensive catalyst made of platinum or the like can be used in a low-temperature environment of less than 250° C., the durability of the catalyst is improved.

Further, it is possible in theory to obtain exhaust gas that is free of nitrogen oxides, something which could not be achieved with the prior art. This in turn makes it possible to obtain an efficient, low-pollution Stirling engine of enhanced thermal efficiency.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the drawings.

First Embodiment

This embodiment is applied to the combustion device of a Stirling engine. The overall construction of the embodiment is as illustrated in FIG. 1.

Figure 1:
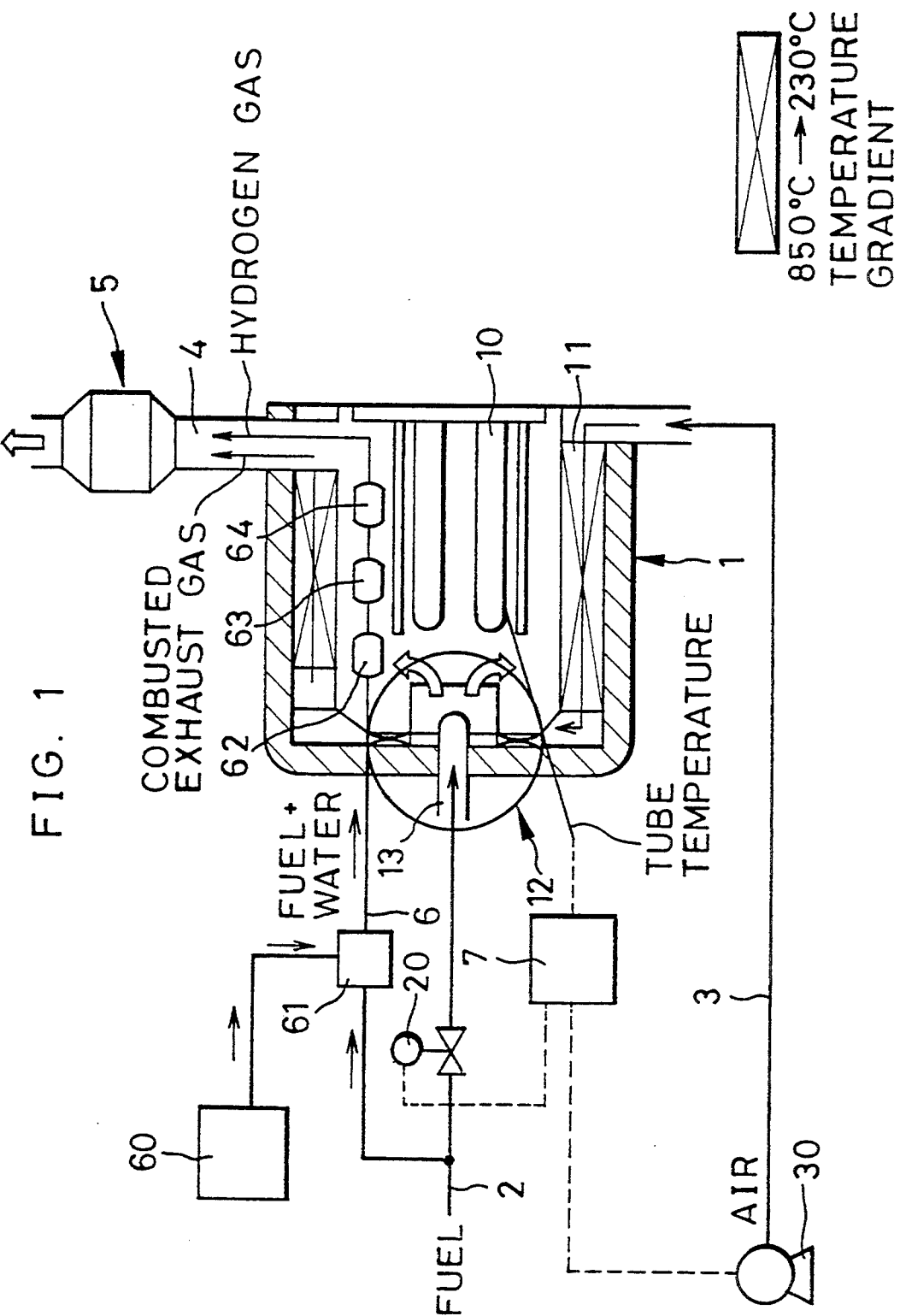
FIG. 1 is an overall structural view for describing the construction of an apparatus according to a first embodiment of the present invention.

As shown in FIG. 1, the combustion device of a Stirling engine includes a combustion chamber 1, a fuel supply 2 for supplying the combustion chamber 1 with fuel, an air supply 3 for supplying the combustion chamber 1 with air, an exhaust passageway 4 for discharging exhaust gas from the combustion chamber 1, a catalytic unit 5 arranged in the exhaust passageway 4, and a hydrogen gas supply 6 connected to the exhaust passageway 4 through the interior of the combustion chamber 1.

The combustion chamber 1 has the form of a bottomed cylinder the periphery of which is covered by an adiabatic wall surface. The bottom of the combustion chamber 1 is provided with radially extending heater tubes 10 filled with a working gas for operating the Stirling engine. A heat exchanger 11 in which air for combustion is preheated by the heat of combustion is disposed generally in the form of a cylinder outside the heater tubes 10. An ignition unit 12 comprising a fuel injection nozzle 13 and an igniting device (not shown) is provided at the center of the crown of the combustion chamber so as to oppose the heater tubes 10. The heat exchanger 11 is in communication with the combusting section.

The fuel supply 2 is so adapted as to supply fuel to the fuel injection nozzle 13 via a valve 20 controlled by a controller 7.

The air supply 3 has a blower 30, which is controlled by the controller 7, and is so adapted that an air flow from the blower 30 enters the heat exchanger 11. The air which has flowed into the heat exchanger 11 is heated thereby and then enters the ignition unit 12. Here the heated air is mixed with an atomized fuel injected from the fuel injection nozzle 13, the mixture is ignited and the resulting flame is jetted into the interior of the combustion chamber 1.

The exhaust passageway 4 opens at a portion of the side wall of the combustion chamber 1 near the bottom thereof to communicate the combustion chamber 1 with the outside. The catalytic unit 5 is disposed in the exhaust passageway 4 at a position where the exhaust gas will attain a predetermined temperature. By way of example, the catalytic unit 5 is constituted by a honeycomb carrier on which an ordinary ternary catalyst is carried.

The hydrogen gas supply 6, which is a characterizing feature of this embodiment, comprises a deionized-water supply device 60, a mixing device 61 for mixing water supplied by the deionized-water supply device 60 with part of the fuel supplied to the fuel injection nozzle 13, a steam reformer 62 mounted in the combustion chamber 1 at a position where a predetermined temperature will be attained, a hot-shiftconverter 63 and a cold-shift converter 64. The arrangement is such that hydrogen gas produced by the cold-shift converter 64 is supplied to the interior of the exhaust passageway 4. In the hydrogen gas supply 6 of this embodiment, approximately 80 wt. % of the mixture of fuel and water becomes hydrogen gas owing to the heat in the combustion chamber 1, and this is supplied to catalytic unit 5 within the exhaust passageway 4.

In the apparatus of the embodiment thus constructed, LNG fuel supplied by the fuel supply 2 is injected into the combustion chamber 1 from the fuel injection nozzle 13. At the same time, the blower 30 is driven into operation so that air is introduced into the heat exchanger 11. The air is supplied to the ignition unit 12. Here the fuel and air are mixed, the mixture is ignited and the resulting flame is injected into the combustion chamber 1.

The heater tubes 10 in the combustion chamber 1 are heated by the flame jetted from the ignition unit 12, and the Stirling engine is driven in continuous fashion. The exhaust gas resulting from combustion is cooled by undergoing a heat exchange with the air in the heat exchanger 11, and the cooled exhaust gas flows into the catalytic unit 5 within the exhaust passageway 4.

In the catalytic unit 5 the exhaust gas resulting from combustion is brought into contact with the hydrogen gas supplied from the hydrogen gas supply 6, and therefore the nitrogen oxides are chemically reduced by the hydrogen gas. As a result, the exhaust gas is discharged into the atmosphere in a state scrubbed of the nitrogen oxides.

Experiment

In an experiment using the apparatus described above, the amount of hydrogen gas introduced into the exhaust gas of combustion was varied and the relationship between the temperature of the exhaust gas at the inlet to the catalyst and the conversion rate of the nitrogen oxides was investigated. Furthermore, the catalyst used for purification was of the monolithic type carrying 2 g of platinum per one liter of catalyst volume, and the catalyst SV value, which is expressed by the gas flow rate (l/hr) divided by the catalyst volume (l) was 50,000/hr. In addition, the composition of the exhaust gas produced by combustion within the combustion chamber 1 was approximately 10% $CO_2$, 79% $N_2$, 4% $O_2$, 100 ppm CO, 7% $H_2O$ and 500 ppm NOx in a state in which no hydrogen gas was supplied. The maximum amount of discharge of nitrogen oxides was 500 ppm.

Figure 7:
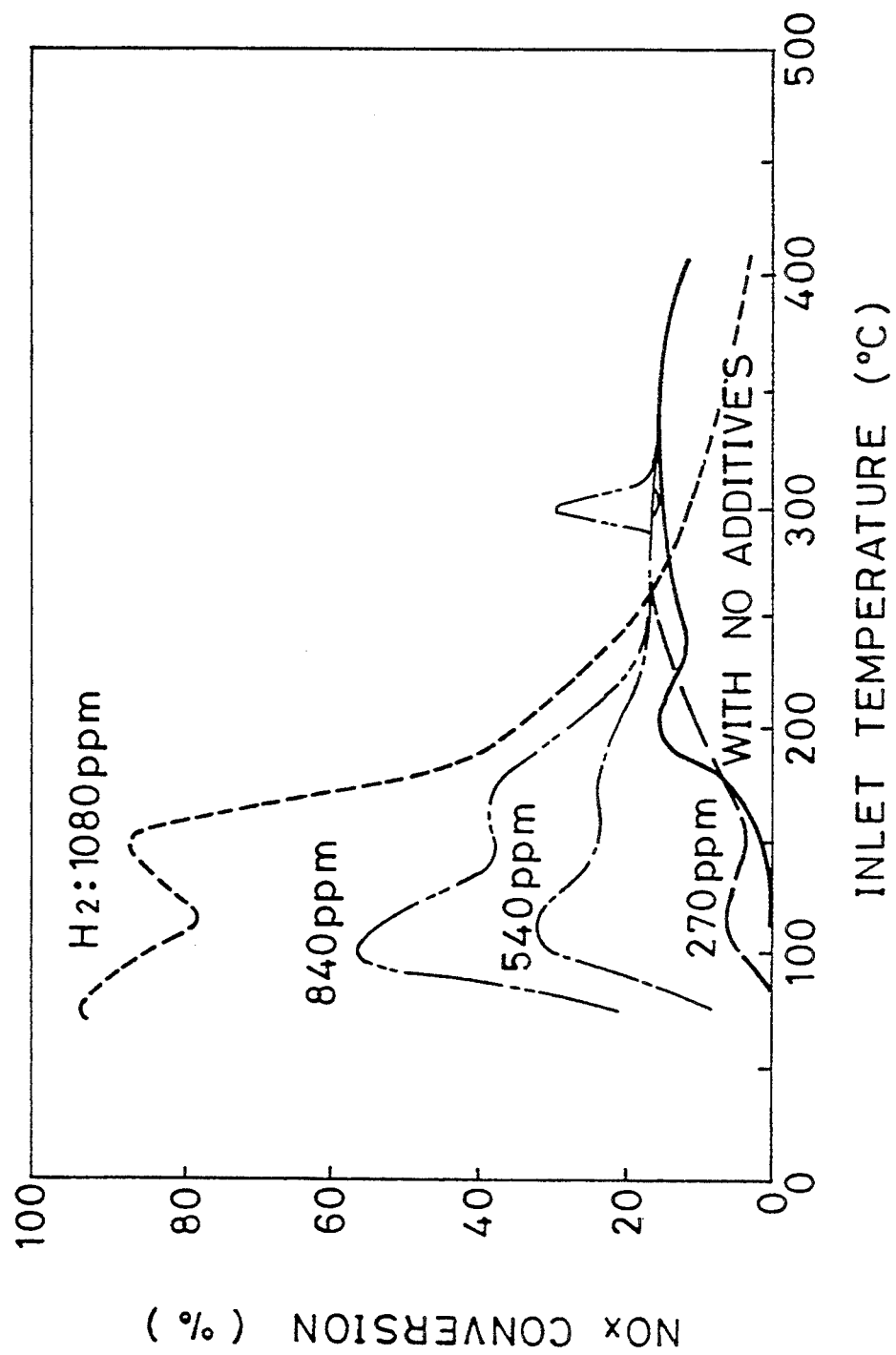
FIG. 7 is a line graph in which the relationship between exhaust gas temperature and NOx conversion rate is investigated while varying hydrogen concentration.

The amount of hydrogen gas was varied to take on values of 0, 270, 540, 810 and 1080 ppm in terms of the concentration of hydrogen gas following its mixture with the exhaust gas, and the NOx conversion rate was measured at each of the above-mentioned values. The results are as shown in the line graph of FIG. 7, in which the temperature of the exhaust gas at the inlet to the catalyst is plotted along the horizontal axis and the rate of conversion of nitrogen oxides is plotted along the vertical axis.

The graph indicates that when the hydrogen concentration is at the high value of 1080 ppm, a high NOx conversion rate of about 90% is obtained even in a low range of inlet gas temperatures of 100~170° C. When the inlet temperature exceeds 200° C., there is a sharp decline in the rate of NOx conversion. The reason for this is that an oxidation reaction occurs because coexisting oxygen is activated at temperatures above 200° C. The supply ratio of hydrogen to nitrogen oxides at a hydrogen gas concentration of 1080 ppm is about 5.

In a case where the hydrogen gas and fuel are supplied at this supply ratio (5) of hydrogen to nitrogen oxides, which falls within the particularly desired range, the fuel fed to the hydrogen supply 6 will have a flow rate on the order of 0.65 l/min. This is approximately 0.3% of a fuel flow rate of 173 l/min, in a case where the fuel is LNG and the combustor output of a Stirling engine is 120 kw. Thus it will be appreciated that the fuel fed to the hydrogen gas supply 6 has very little effect upon the overall rate of fuel consumption.

Unlike a piston internal engine, the structure of a Stirling engine is such that there is absolutely no mixing of lubricant with exhaust gas. This means that the catalyst is not exposed to $SO_2$ produced by combustion of sulfur or phosphorous, especially sulfur, contained in lubricants, and therefore the catalyst will not undergo deterioration owing to the toxic effects of $SO_2$. Moreover, the purifying catalyst can be placed at the position of a prescribed gas temperature at the most downstream point in the exhaust system so that it may be used at a location where the temperature ranges from about 170° C. to 100° C. Thus there is absolutely no danger of thermal deterioration since the catalyst can be used at a temperature far below the limit of thermal resistance of the catalyst.

Accordingly, in an apparatus such as a Stirling engine which relies fundamentally upon a continuous combustion device, as in this embodiment, an extremely long lifetime can be achieved utilizing the capabilities of the catalyst to the maximum degree.

Second Embodiment

Figure 2:
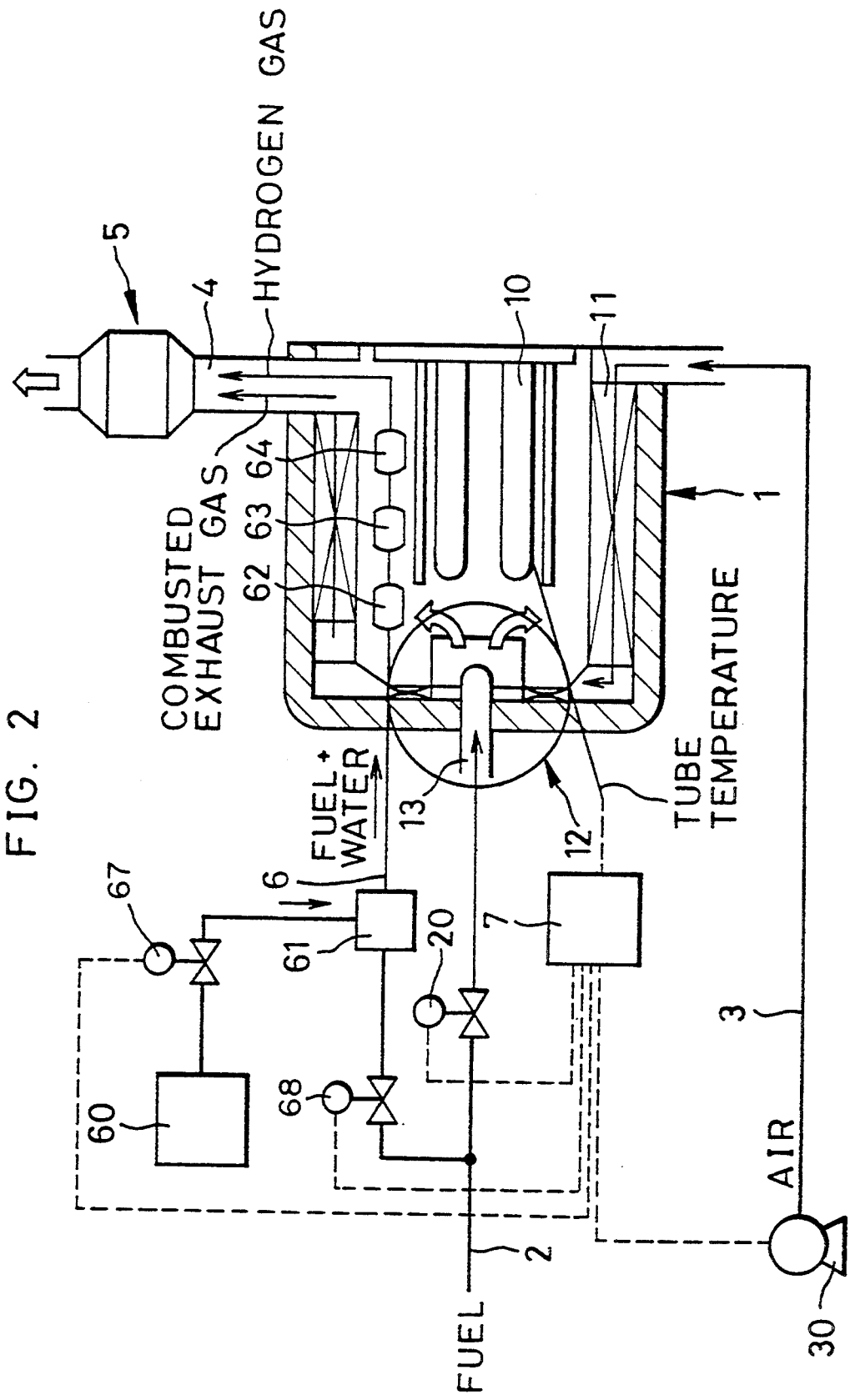
FIG. 2 is an overall structural view showing a second embodiment in which a hydrogen supply in FIG. 1 is provided with a supply control valve.

This embodiment is similar to the first embodiment except for the arrangement of the hydrogen gas supply 6, as illustrated in FIG. 2. Specifically, in this embodiment, a valve 67 is provided between the deionized-water supply device 60 and the mixing device 61, and a fuel supply pipe directed toward the mixing device 61 is provided with a valve 68. The arrangement is such that the two valves 67, 68 are controlled by the controller 7.

In order that the amount of fuel and water supplied will conform to the maximum amount of exhaust of nitrogen oxides, the flow rates of the water and fuel in the apparatus according to this embodiment are regulated by the controller 7 to adjust the amount of hydrogen gas supplied. As in the first embodiment, an appropriate amount of the hydrogen gas can be supplied to purge the exhaust gas of nitrogen oxides.

If the nitrogen oxides and hydrogen gas are mixed together perfectly in equivalent amounts, in theory the nitrogen oxides will be completely purged by chemical reduction. Since some of the fuel is used in the production of the hydrogen gas, there may be some concern that this will reduce engine efficiency. However, trial calculations using a 20 kw class engine indicate that the ratio of the fuel used for hydrogen-gas production to the fuel used for combustion is a maximum of 1% and therefore the effect of the decline in efficiency upon the engine is negligible.

Furthermore, the preheating of the air for combustion can be performed sufficiently to enable the attainment of high combustion temperatures, and the amount of heat recovery is increased. This contributes to improved engine efficiency.

Third Embodiment

Figure 3:
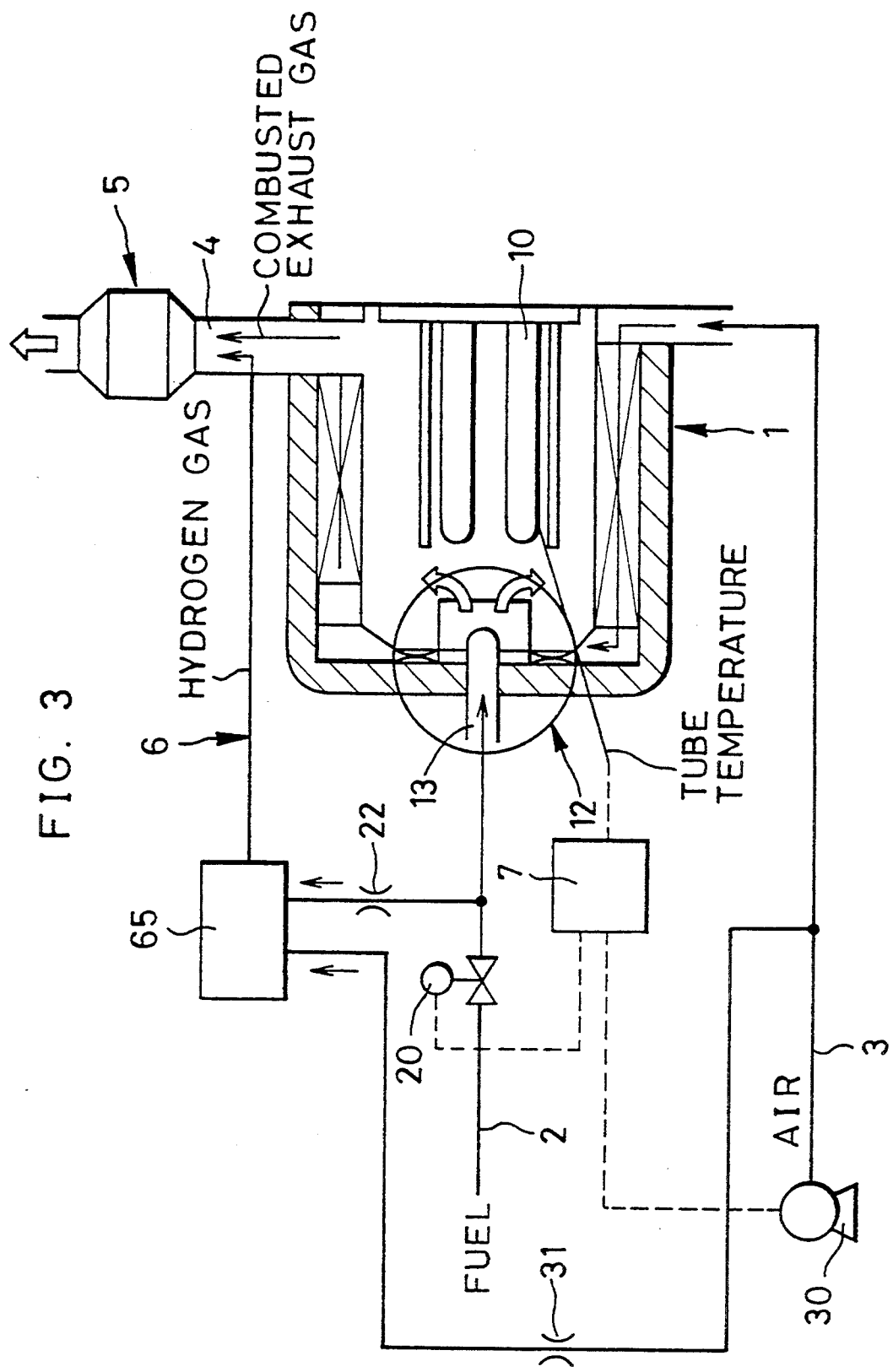
FIG. 3 is an overall structural view showing a third embodiment of the apparatus in which air is introduced for partial combustion process outside a combustion chamber and the hydrogen gas produced by oxidation is used as the hydrogen supply.

As shown in FIG. 3, here the hydrogen gas supply 6 is adapted to produce hydrogen by the partial combustion process in other aspects the arrangement is the same as above. Further, the arrangement of the combustion chamber 1, fuel supply 2, air supply 3, catalytic unit 5 and controller 7 is the same as in FIG. 1. The characterizing feature of this embodiment is that the method of producing the hydrogen gas does not rely upon the steam reformer method but instead utilizes a gas obtained by the partial combustion process outside the combustion chamber 1 and employs this gas as the hydrogen gas supply 6. More specifically, use is made of a constriction 22 to regulate part of the fuel in terms of the amount supplied, and use is made of a constriction 31 to regulate part of the air in terms of the amount supplied. The air and fuel thus regulated enter a hydrogen generating device 65, where the fuel is partially oxidized. The necessary amount of hydrogen gas which results is supplied to the exhaust passageway 4.

Figure 4:
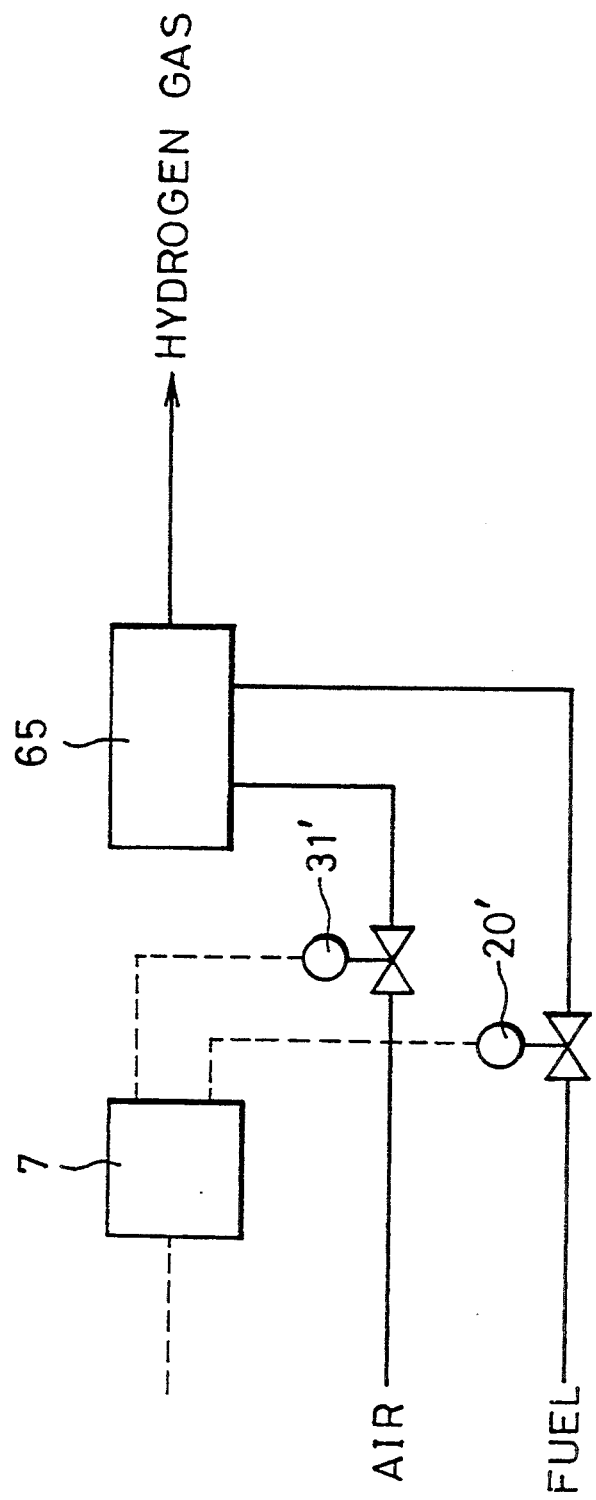
FIG. 4 is an enlarged view showing a portion of the hydrogen supply in FIG. 3.

Furthermore, as shown in FIG. 4, the necessary amount of hydrogen gas can be similarly supplied to the exhaust passageway 4 by controlling the amount of supply of part of the fuel and air using a fuel control valve 20' and an air control valve 31' instead of the constrictions 22 and 31 mentioned above.

Figure 5:
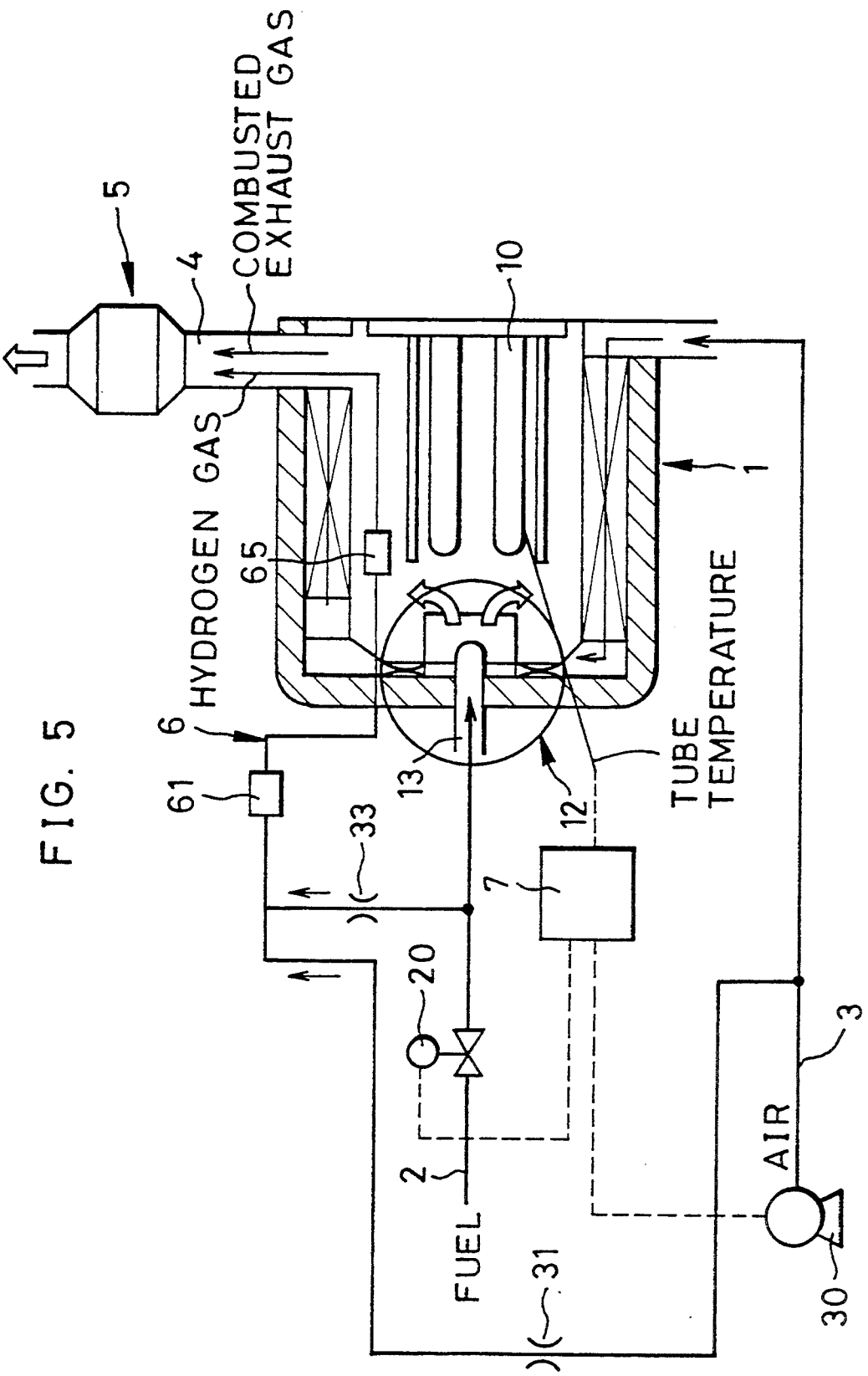
FIG. 5 is an overall structural view of an example in which a device for generating the hydrogen supply is provided in a combustion chamber in FIG. 3.

Further, as shown in FIG. 5, the necessary amount of hydrogen gas can be similarly supplied to the exhaust passageway 4 by disposing the hydrogen generating device 65 inside the combustion chamber 1 and utilizing the heat of the combusted exhaust gas.

Fourth Embodiment

Figure 6:
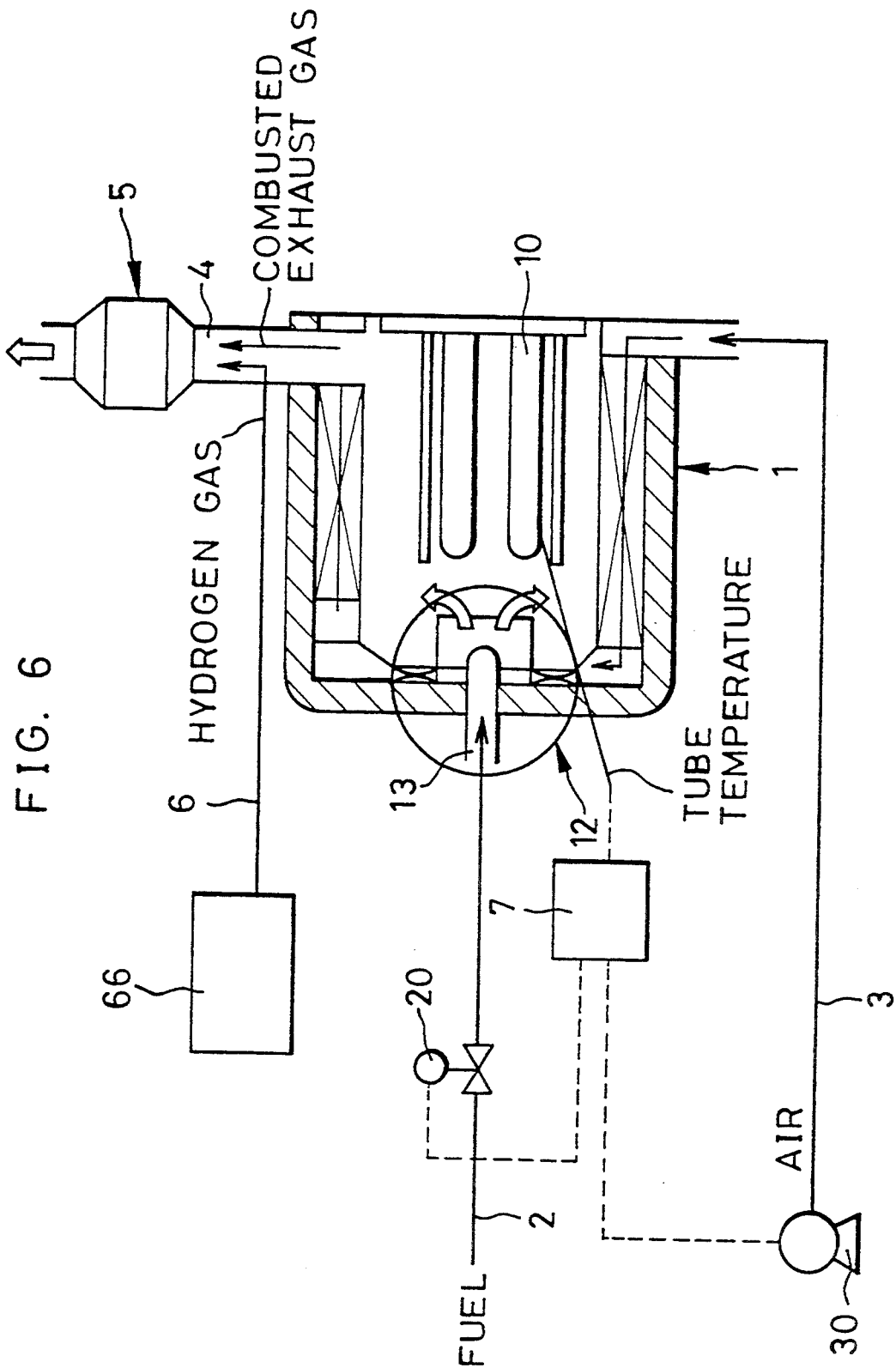
FIG. 6 is an overall structural view showing a fourth embodiment of the apparatus in which the hydrogen supply is realized by electrolysis in the arrangement of the combustion chamber shown in FIG. 1.

In this embodiment, shown in FIG. 6, the hydrogen supply 6 is realized by generating hydrogen gas using a hydrogen gas generating device 66 which relies upon electrolysis of water utilizing a proton-conductive membrane. The necessary amount of resulting hydrogen gas can be supplied from the device 66 to the combusted exhaust gas within the exhaust passageway 4. Depending upon the particular case, the necessary amount of hydrogen gas can be supplied directly from a hydrogen gas tank.

In each embodiments, a nozzle having a lot of perforations or a single opening may be located in the interior of the exhaust passageway 4 and connected to the hydrogen gas supply line 6. A baffle plate may be disposed between the nozzle and the catalytic unit 5 to make an uniform flow of the hydrogen gas and increase mixture of the hydrogen gas and the exhaust gas. In FIGS. 1 and 2, it is possible to locate the steam reformer 62 and the converters 63, 64 within the heat exchanger 11.

As may apparently widely different embodiments of the present invention can be made without departing from the spirit and scope thereof, it is to be understood that the invention is not limited to the specific embodiments thereof except as defined in the appended claims.

What is claimed is:

1. An apparatus for reducing nitrogen oxides from a combustion exhaust gas comprising:

a combustion chamber;

a first supply means for supplying said combustion chamber with fuel and air;

an exhaust gas passageway for discharging exhaust gas produced by combustion of said fuel in said combustion chamber;

a catalytic means arranged in said element exhaust passageway for purging toxic components contained in the exhaust gas discharged; and a second supply means for supplying reformed gas produced by a steam reforming process to contact with said exhaust gas which enters said catalytic means, said second supply means comprising:

a deionized-water supply means for supplying deionized water;

a mixing means for mixing the deionized water from said deionized-water supply means with fuel from said first supply means;

a steam reformer, which is supplied with the mixture of deionized water and fuel from said mixing means, mounted in said combustion chamber at a position where a predetermined temperature will be attained; and hot- and cold-shift converters connected to a water-vapor modifying means for producing reformed gas that is supplied to the exhaust gas in said exhaust passageway.

* * * * *